No. 702,019. Patented June 10, 1902.
J. MARCHBANK & N. P. BIDSTRUP.
LIQUID MEASURING APPARATUS.
(Application filed Jan. 16, 1902.)
(No Model.)
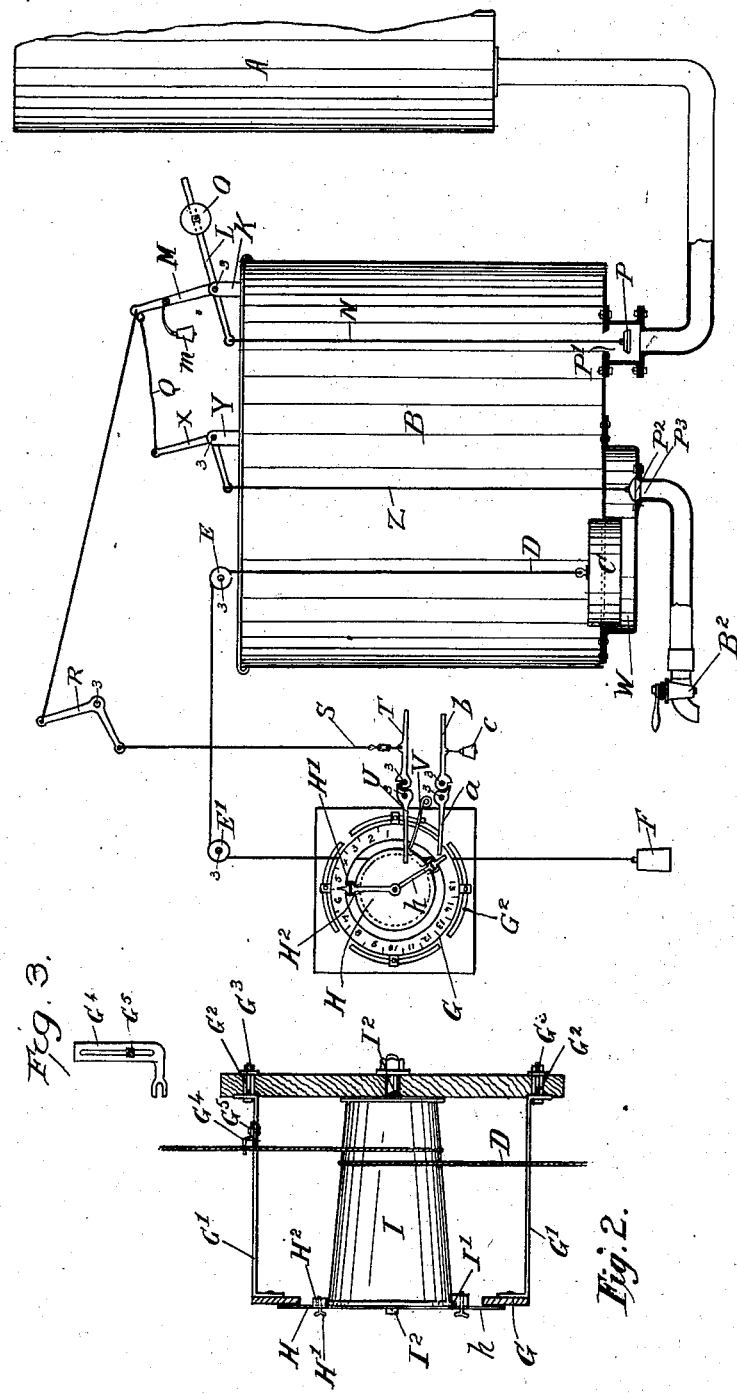
WITNESSES:
INVENTORS
James Marchbank
Neils Percival Bidstrup
BY
Richard
ATTORNEYS.

UNITED STATES PATENT OFFICE.

JAMES MARCHBANK AND NIELS PERCIVAL BIDSTRUP, OF BROADFORD TOWNSHIP, VICTORIA, AUSTRALIA.

LIQUID-MEASURING APPARATUS.

SPECIFICATION forming part of Letters Patent No. 702,019, dated June 10, 1902.

Application filed January 16, 1902. Serial No. 90,043. (No model.)

*To all whom it may concern:*

Be it known that we, JAMES MARCHBANK and NIELS PERCIVAL BIDSTRUP, engineers, subjects of the King of Great Britain, residing in the township of Broadford, in the State of Victoria, Australia, have invented a certain new and useful Liquid-Measuring Apparatus, of which the following is a specification.

The object of the invention is to provide means whereby the flow of any liquid sufficiently fluid from a main to a measuring-receptacle may be automatically arrested or cut off when a predetermined quantity shall have passed into such measurer, such automatic cutting off of the supply of liquor to the measuring-tank when the desired quantity shall have entered same being effected by the rising therein of a float and the reverse action of a counterbalance-weight attached to a cord or chain and intermediate connections revolving a striking pin or pointer into engagement with a trigger and connections controlling inlet and outlet valves reversely. The descending action of the float as the fluid is drawn off reverses the revolving direction of a second pointer, revolving it into engagement with a reversely-set bell-trigger, thus automatically signaling the instant the fluid in measurer shall have been drawn off.

Referring to the drawings, which form a part of this specification, Figure 1 is an elevation of the whole apparatus including the quantitative scale and automatically-operating mechanism; Fig. 2, a side view of annular quantitative scale, striking scale-pointer, signal-striking pointer, and cone-shaped or tapering revolving barrel with cord or chain passed around same and adjustable guide-fork for keeping such cord or chain in true position on barrel when latter is in motion. Fig. 3 is a view of a detail.

A is the main or supply tank; B, the measuring-tank, which may respectively be made of any size or shape, according to requirements, and of any suitable material.

In the measuring-tank B is a float C, connected to chain or cord D, working in pulleys E E', such cord or chain being passed around the revolving barrel I, the end of such cord carrying or suspending a counterbalance-weight F, such barrel I being suitably mounted horizontally on spindle I$^2$ in rear of fixed annular quantitative scale G, such barrel I carrying a striking pin or pointer H around such scale in its annular course, as hereinafter described. The counterbalance-weight F is controlled in its downward course by the ascent of the float C on the surface of the fluid as it flows in and gradually rises in the measurer B, such float being the heavier, so that as the float rises in B the barrel I is set in annular motion by the balance-weight F as it descends proportionately to the ascent in B of such float C. By releasing the set-screw H' the pointer H is freed to be moved by hand to point to any number on the annular scale representing the desired quantity of liquor to be drawn off into the measurer B—as, for instance, five and a half gallons—as the pointer appears set in the drawings, Fig. 1. When so set, the pointer is then clamped securely to an annular projecting rim I' on inner end of the barrel I by means of set-screw H'. The counterbalance-weight F descending, the barrel I is caused to revolve, carrying the pointer H around in its course till such pointer H meets, engages with, and bears down the projecting trigger-arm U, (overcoming the supporting-spring V,) releasing the trigger T, attached to the end of cord or chain S, when the balance-weight O of the bell-crank lever L M, mounted pivotally on standard K, falls, operating such bell-crank lever L M, the arm M of which carries a signal-bell $m$ in the cord or chain N, attached to such arm L, suspending plug P of inlet-valve P' of measurer B. The end of cord or chain Q is attached to bell-crank lever X, (mounted pivotally on standard Y,) suspending by cord or chain Z the plug P$^2$ of outlet-valve P$^3$ of measurer B, the cord Q being passed through eye in said arm M, the other end of cord Q being attached to bell-crank lever R, suspending by cord or chain S the trigger T, the inlet-valve P', and outlet-valve P$^3$, thus operating simultaneously, but reversely, one opening as the other closes alternately the combined movements of such operating parts when the trigger T is released, thus automatically cutting off the flow of fluid by drawing the plug P upward into the inlet-valve P', closing same and opening outlet-valve P³ of the measurer B the instant the predetermined quantity of fluid shall have passed from A into B, leaving the fluid in B free to be drawn off by the tap B² when desired. As the liquor is being drawn off from the measurer B the float C descends, causing the counterbalance-weight F to ascend in unison with C, thus reversing the annular motion of the barrel I, (see Fig. 2,) and the pointer $h$ (attachable to the rim of such barrel similarly to H) when such descending float reaches the bottom of recess W in measurer B, engages with trigger $a$, and releases the bell-trigger arm $b$ from the trigger $a$, causing the bell $c$, attached by steel strap to $b$, to ring, intimating that the measurer B is emptied ready to be reset, as before described. It will thus be readily understood—say in a butter-factory—in the sale and measuring off to customers of skim-milk the attendant may set the apparatus to measure off a given number of gallons by the trigger mechanism described and leave the apparatus to complete the operation automatically and the purchaser to draw off by tap B² the measured amount of his purchase, the first and final steps in the operation being signaled to such attendant automatically as they conclude, as before described.

Referring to portion of Fig. 1 and Fig. 2, an eyehole in the butt-ends of the pointers H $h$, respectively, receives loosely the fore end of set-spindle I², on which they are placed. An under plate is provided on each pointer to correspond with the fore enlargement of such pointers, such under plate and enlargement lying apart, so as when compressed by set-screw to form a clamp H², in which the annular projecting rim I' on fore end of barrel I passes, so that so long as the pressure of set-screw H' is released the clamp H² remains open, leaving the pointers H $h$ free to be turned in either direction to right or left around the annular scale G to any desired number on such scale representing the number of gallons required to be measured off when by means of such set-screw H' the clamp H² is closed and securely tightened on such annular rim I', when such pointers become fixtures to the barrel I, such barrel and pointers thenceforth (till released) moving as one piece. In Fig. 2 the annular quantitative scale G is mounted on four legs G', projecting horizontally from frame mounting the barrel I. The feet of such legs are set in segmental slots on rear frame and secured by bolt and nut G³, so as to be capable of being moved around to right or left for convenience of adjustment of the scale in its exact position when fitted in the first instance or subsequently if requiring correction or readjustment. G⁴ is an adjustable or chain guide sliding on one of the legs G' and secured by set-screw G⁵, in which such cord or chain works, keeping it in true position on barrel I, determined by figure on scale G at which pointer H is set. The object of making such barrel I cone-shaped or tapered is that when used for, say, measuring skim-milk in a butter-factory the process of separating the cream takes off with the cream more or less milk, not always a uniform quantity, entitling the dairyman to a little more or less "return" over or under in the form of skim-milk, in which case the graduated or tapered shape of the barrel I permits of its being set to measure off a little more or less than the predetermined number of gallons, which would not be the case were the barrel I of uniform circumference.

It is obvious that a suitable framework for mounting and supporting the operating mechanism and connections before described would have to be provided; but to avoid confusion such framework (save in a few instances) has been omitted from the drawings, the small Fig. 3 therein denoting the various points where parts would require to be attached or mounted to such frame. It is also obvious that the pointers H $h$, moving integral with the barrel I, obviate any possible inaccuracy in the measuring operation by reason of climatic or atmospheric influence on the cords or chains used in and with the apparatus.

Having now described our invention, what we claim as new, and desire to secure by Letters Patent, is—

1. In combination, a main tank A, a measuring-tank B, an inlet-valve between the main and measuring tanks, an outlet-valve from the measuring-tank, a float C in the measuring-tank, a trip device, an adjustable pointer connected with the float for operating the trip, a bell-crank R connected to the trip, a pair of bell-crank levers L M and X connected with the bell-crank R and connections from the pair of bell-cranks to the inlet and outlet valves, substantially as described.

2. In combination, a main tank, a measuring-tank connected therewith, an inlet-valve P for the measuring-tank, an outlet-valve P² for the said measuring-tank, a cone-shaped barrel I mounted horizontally, a float C in the measuring-tank, a cord connecting said float and the barrel I, said barrel having a projecting rim I', pointers H and $h$ adjustably connected to said rim, a scale G over which the pointers are adapted to be adjusted, legs G' upon which the scale is mounted, segmental slots in the frame with means for adjustably holding the legs thereby, an adjustable cord-guide on one of the legs, a weight connected with the barrel for rotating it reversely to that imparted by the weight of the float, a trip device controlled by the pointer H, connections between the same and the inlet and outlet valves and a signal controlled by the pointer $h$, substantially as described.

3. In combination with the main and measuring tanks and the inlet and outlet valves for the latter, a float C in the measuring-tank, a trigger-arm U, a trigger-arm T controlled thereby, connections between the said trigger-arm T and the inlet and outlet valves, a rotary pointer H connected with the float and arranged to operate the trigger U and a weight O for operating the valves reversely when the trigger-arm T is released, substantially as described.

4. In combination, the main and measuring tanks, inlet and outlet valves for the latter, a float, a barrel with connections to the float whereby the barrel is operated, means for rotating the barrel reversely to the movement imparted by the float, a pointer connected with the barrel, a trip arranged to be operated thereby, and connections between said trip and the inlet and outlet valves, substantially as described.

5. In combination, the main and measuring tanks, inlet and outlet valves for the latter, a float, a barrel with connections to the float whereby the barrel is operated, means for rotating the barrel reversely to the movement imparted by the float, a pointer connected with the barrel, a trip arranged to be operated thereby, connections between said trip and the inlet and outlet valves, a second pointer controlled by the barrel and a signal-trip operated thereby to indicate when the measuring-tank is empty, substantially as described.

6. In an apparatus as specified, the combination with a measuring-tank, a cone-shaped or tapering barrel I, mounted horizontally and rotating on a set-spindle $I^2$ and projecting rim such as I'; pointers, H, $h$, each having an adjustable clamp and set-screw $H^2$ $h'$; annular quantitative scale, G, and legs for mounting such scale, G'; segmental slots in or secured to frame, $G^2$, for reception of the feet of such legs secured therein by bolts and nuts, $G^3$; and adjustable sliding cord or chain guide and set-screw such as $G^4$, $G^5$, such barrel and pointers revolving together as one piece by the agency of cord or chain D and counterbalance-weight F, and reversely by float, C, as and for the purposes before described and as illustrated.

In witness whereof we have hereunto set our hands in presence of two witnesses.

JAMES MARCHBANK.
NIELS PERCIVAL BIDSTRUP.

Witnesses:
ALFRED FORD,
W. H. MOCHAM.